United States Patent
Becker et al.

[11] Patent Number: 5,316,379
[45] Date of Patent: May 31, 1994

[54] VEHICLE WITH AN ANTILOCK CONTROLLER

[75] Inventors: Rolf Becker, Ditzingen; Ulrich Belzner, Schwieberdingen; Rolf-Hermann Mergenthaler, Leonberg; Gerhard Heess, Tamm, all of Fed. Rep. of Germany

[73] Assignee: Robert Bosch GmbH, Stuttgart, Fed. Rep. of Germany

[21] Appl. No.: 71,197

[22] Filed: Jun. 2, 1993

Related U.S. Application Data

[63] Continuation-in-part of Ser. No. 800,165, Nov. 27, 1991, abandoned.

[30] Foreign Application Priority Data

Nov. 29, 1990 [DE] Fed. Rep. of Germany ....... 4038079

[51] Int. Cl.$^5$ ............................ B62D 6/00; B60T 8/32
[52] U.S. Cl. ................................. 303/100; 303/95; 180/142; 364/426.02
[58] Field of Search ...................... 303/93, 95, 100; 180/142, 97.1; 280/91; 364/424.05, 426.02

[56] References Cited

U.S. PATENT DOCUMENTS

| | | | |
|---|---|---|---|
| 4,566,710 | 1/1986 | Furakawa et al. | 180/140 |
| 5,035,295 | 7/1991 | Leiber et al. | 180/140 |
| 5,089,967 | 2/1992 | Haseda et al. | 303/100 X |

Primary Examiner—Robert J. Oberleitner
Assistant Examiner—Josie A. Ballato
Attorney, Agent, or Firm—Felfe & Lynch

[57] ABSTRACT

System for controlling yawing moment in a vehicle equipped with ABS and rear wheel steering includes a controller which generates a compensation steering angle for the rear wheels based on the difference between brake pressures at the front wheels. The difference is filtered so that the angle is zero up to a minimum pressure threshold and thereafter consists of a constant portion added to a variable portion which decreases with time. The compensation steering angle so generated may be modified by a correction factor dependent on the transverse acceleration of the vehicle and a further correction factor dependent on the velocity.

12 Claims, 5 Drawing Sheets

VEHICLE WITH AN ANTILOCK CONTROLLER

This is a continuation-in-part of Application Ser. No. 07/800,165 filed Nov. 27, 1991.

BACKGROUND OF THE INVENTION

U.S. Pat. No. 5,089,967, which is hereby incorporated by reference, discloses a system in which the brake pressures in the separately controlled wheels of an axle are measured and their difference $\Delta P$ is used to obtain a steering angle $\delta = K \cdot \Delta P$. The steering angle is limited to a top value (FIG. 8A). A variety of possibilities of correction are provided to improve the steering angle characteristic in relation to $\Delta P$ (FIGS. 8B and 8C), a correction based on the vehicle speed being performed, in accordance with FIG. 8.

SUMMARY OF THE INVENTION

The present invention optimizes the desired compensation of the yawing moment on road surfaces of different friction qualities ($\mu$ split). The yawing moment is caused by different coefficients of friction on opposite sides of the vehicle during ABS control. The frequently applied slowing of the build-up of the yawing moment, which of course lengthens the braked travel, can be eliminated by intervention in the steering. Also, it is now possible, instead of controlling the back wheels by select low, to make use of a modified individual wheel control at the rear wheels, the "high" wheel receiving a higher brake pressure at a different $\mu$ and achieving a gain in braking force. The invention is applied in that case where rear-axle steering is present, but the compensation steering angle $\delta$ can be superimposed also on the front wheel steering angle. The rear wheel steering can also be used for other purposes, e.g., improvement of the dynamic behavior, so that here too the compensation angle $\delta_{GMK}$ is superimposed.

DETAILED DESCRIPTION OF THE PREFERRED EMBODIMENTS

Figure 1:
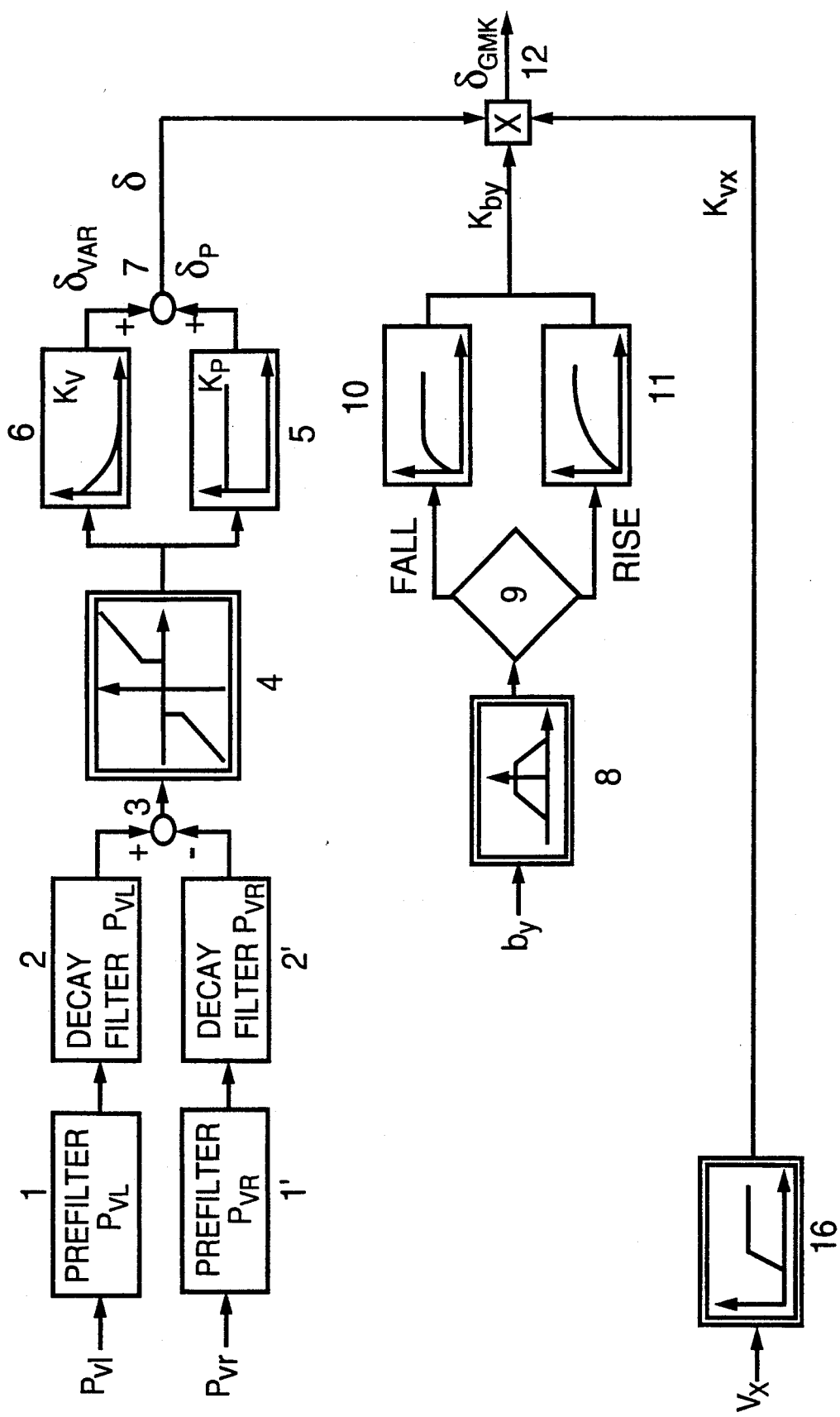
FIG. 1 is a block circuit diagram of a compensation circuit, wherein transverse acceleration $b_y$ is measured.

FIG. 1 deals with the compensation of the brake yawing moment by a rear axle steer with a select-low braked rear axle.

The brake pressures in the front wheels provide a rough measurement of the brake force used, the difference $\Delta p$ of the pressures is consequently a measure of the braking yaw moment. The rear axle steering angle $\delta$ produces an opposite moment about the vehicle's "high" axle, which if appropriately designed compensates the braking yaw moment. The unvarying relationship between $\delta$ and $\Delta p$ is described by the amplification factor $k_p$, i.e. $\delta = k_p \Delta P$.

Since during an antilock braking the brake pressures are constantly modulated, a rear axle steering control with nothing but the above-mentioned proportionality would react in a very choppy way. Consequently filtering is provided before the pressure difference is computed. This difference must first of all overcome a significant threshold (dead zone) before the control becomes active; this also is intended to avoid rear steering choppiness in the case of small disturbances.

The filtering of the measured brake pressures $P_{vl}$ and $P_{vr}$ takes place in two stages.

In the prefilters 1 and 1' disturbances by the measuring noise (peaks, A/D errors) are to be suppressed, which is achieved by a variable limiting of the rates of pressure change. The rise limiting remains at low levels in the case of frequent alternation of pressure build-up and decay; in the case of a change of the same sign over a longer period of time it is continuously raised to a maximum level.

The decay filters 2 and 2' are especially aimed at the relationships between ABS control cycles (ABS control cycles with pulse series) and rear wheel steering. So that the rear wheel steering angle will not directly follow the pressure jumps, especially in the pressure decay phases, the filtered brake pressures are permitted to decrease only very slowly in the first pressure drop after a pressure rise phase. At the end of a given period (e.g., 100 microseconds) the time constant of the low—pass filter is reversed, so that the filtered value (output of blocks 2 or 2') more rapidly approaches the output levels of the prefilter (1 or 1').

Figure 2:
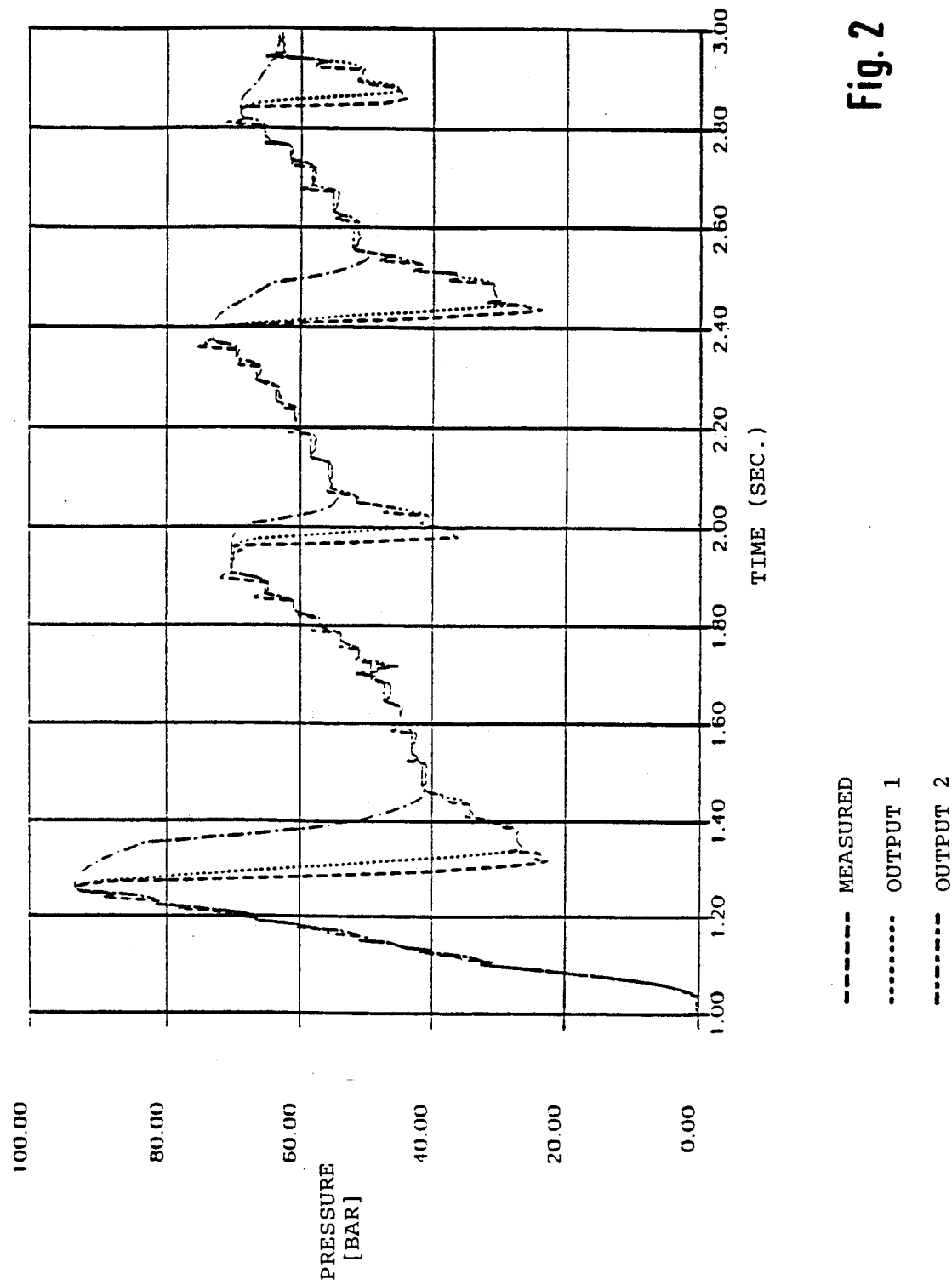
FIG. 2 is a diagram of pressure measured at a front wheel, an intermediate filtered pressure, and a final filtered pressure.

The measured front wheel pressure as well as the intermediate value and the filtered pressure are represented in FIG. 2.

Accordingly, from the filtered brake pressures $P_{Vlf}$ and $P_{Vrf}$ the difference between the output levels of the filters 2 and 2' is formed in a subtractor 3, and, after passing through a dead zone 4, delivers the input levels $f(\Delta p)$ to the control amplifiers 5 and 6, whose output signals $\delta_p$ and $\delta_{var}$ are totaled in adder 7 to produce the steering angle $\delta$.

The control consists essentially of a constant portion $\delta_p = f(\Delta p) \cdot k_p$ (Block 5).

Through the filtering, the dead zone and the dynamic of the steering actuator, first a yawing movement builds up, which is preserved even in the case of ideal design of the constant amplification factor $k_p$. Therefore at the beginning of the intervention of the control a portion variable with time $\delta_{var} = f(\Delta p) \cdot k_v$ (Block 6)

is computed.

The variable factor $k_v$ is set at a specific value when the difference between the filtered pressures passes through the dead zone and then continually decreases.

When the control is switched on, therefore, the rear wheel steering angle $\delta$ is visibly excessive, so that the yaw velocity changes its sign and the yaw angle is thus again reduced. The driver in this case has virtually no need to intervene. Over the entire braking action, the yaw velocity assumes but very small levels, and the unsteadiness is thus largely compensated by the ABS control cycles.

Both at low and at high speeds, the yaw moment compensation prevents the vehicle from skidding laterally. With increasing velocity the support it provides becomes more evident.

In experiments with the steering wheel held, the lane deviation remains very small; a yaw angle builds up very slowly.

As stated above, the formerly used measurement of the front wheel brake pressures can be replaced also by an estimating algorithm for determining the brake pressure from the output data of the ABS valve operating times. Such al algorithm is described in German Patent Application 'P 4030724.7. The filtering of the brake pressures can be simplified such that blocks 1 and 1' are eliminated.

It is possible to influence the front wheel steering angle according to the same principle; only quantitative differences occur.

The introduction of the time-variable amplification offers important advantages in the case of different friction factors on different sides of the vehicle, but in the case of hard braking on a curve it leads to oversteering of the vehicle. To avoid this disadvantage the transverse acceleration of the vehicle is taken into account. However, the allowance for the transverse acceleration, as it is now described, does not assume the obtaining of the steering angle according to the uppermost branch of FIG 1.

On the basis of the measured transverse acceleration $b_y$, first a correction factor $K_{by}$ is determined through the characteristic curve (Block 8), and is tied in with the rear wheel steering angle $\delta$ by multiplication (in block 12).

Figure 3:
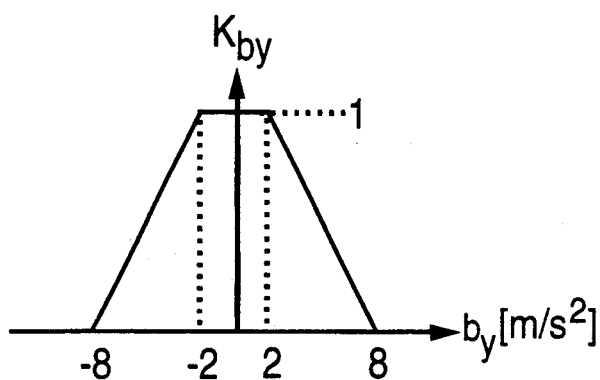
FIG. 3 is a characteristic curve for correcting the measured value of transverse acceleration.

This characteristic curve of block 8, shown in detail in FIG. 3, brings it about that, at low transverse accelerations, e.g., lower than a lower accelerating limit 2 m/s², the compensation remains unaffected ($K_{by}=1$); above that an attenuation proportional to the transverse acceleration takes place, and at very great transverse acceleration, e.g., above an upper acceleration limit 8 m/s², the compensation is completely suppressed ($K_{by}=0$). This characteristic is based on the knowledge that in the case of μ-split braking the occurring transverse accelerations are approximately in the range of ±2 m/s².

This characteristic curve alone is not sufficient. Fluctuations of the transverse acceleration at values $|b_y|>2$ m/s² (e.g., change of sign of by in the case of braked lane changing) lead to proportional fluctuations of the correction factor and thus of the rear wheel steering angle, which are perceptible as noise. Disadvantageous also, is the fact that these steering angle fluctuations have an effect again on $b_y$. An appropriate filtration of the correction factor is therefore necessary. It must, however, assure that, if a transverse acceleration builds up, an attenuation of the GMK (yaw moment compensation) will take place quickly, but in the case of certain driving maneuvers, e.g., lane change, re-engagement will not take place too quickly. This is achieved with two alternative low-pass filters 10 and 11 with a great difference in time constants. The steering angle correction $K_{by}$ related to transverse acceleration thus has the form represented in blocks 8, 10 and 11 in FIG. 1.

Typical values of the time constants of the two alternative low-pass filters are 10 ms and 1000 ms, respectively.

Blocks 9, 10 and 11 are intended to symbolize the following situation. If the transverse acceleration $b_y$ increases and $K_{by}$ becomes lower, the low-pass filter 10 with the low time constant becomes active, i.e., the starting value $K_{by}$ rapidly follows the input from block 8 and reduces the steering angle. If, however, the transverse acceleration diminishes and thus $K_{by}$ increases, the low pass filter 11 with the high time constant becomes active, so that $K_{by}$ follows the input value from block 8 but slowly.

By these measures an attenuation of the yawing moment is achieved in the event of braking on turns and braked lane changes at high friction levels. The remaining percentages of the rear wheel steering angle δGMK no longer have an adverse effect on road performance.

Figure 1A:
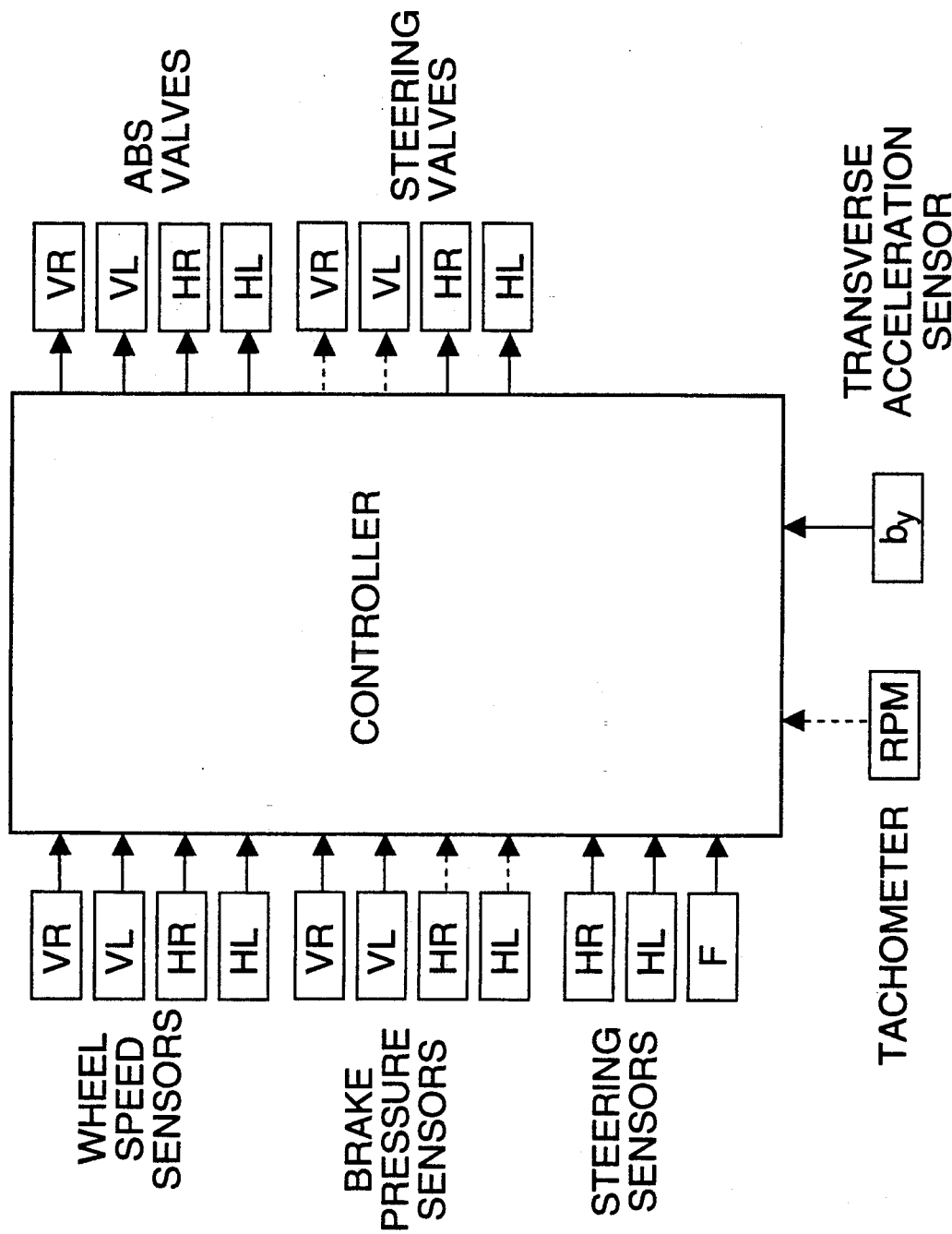
FIG. 1A is a system diagram showing the inputs and outputs of the controller.
Figure 1B:
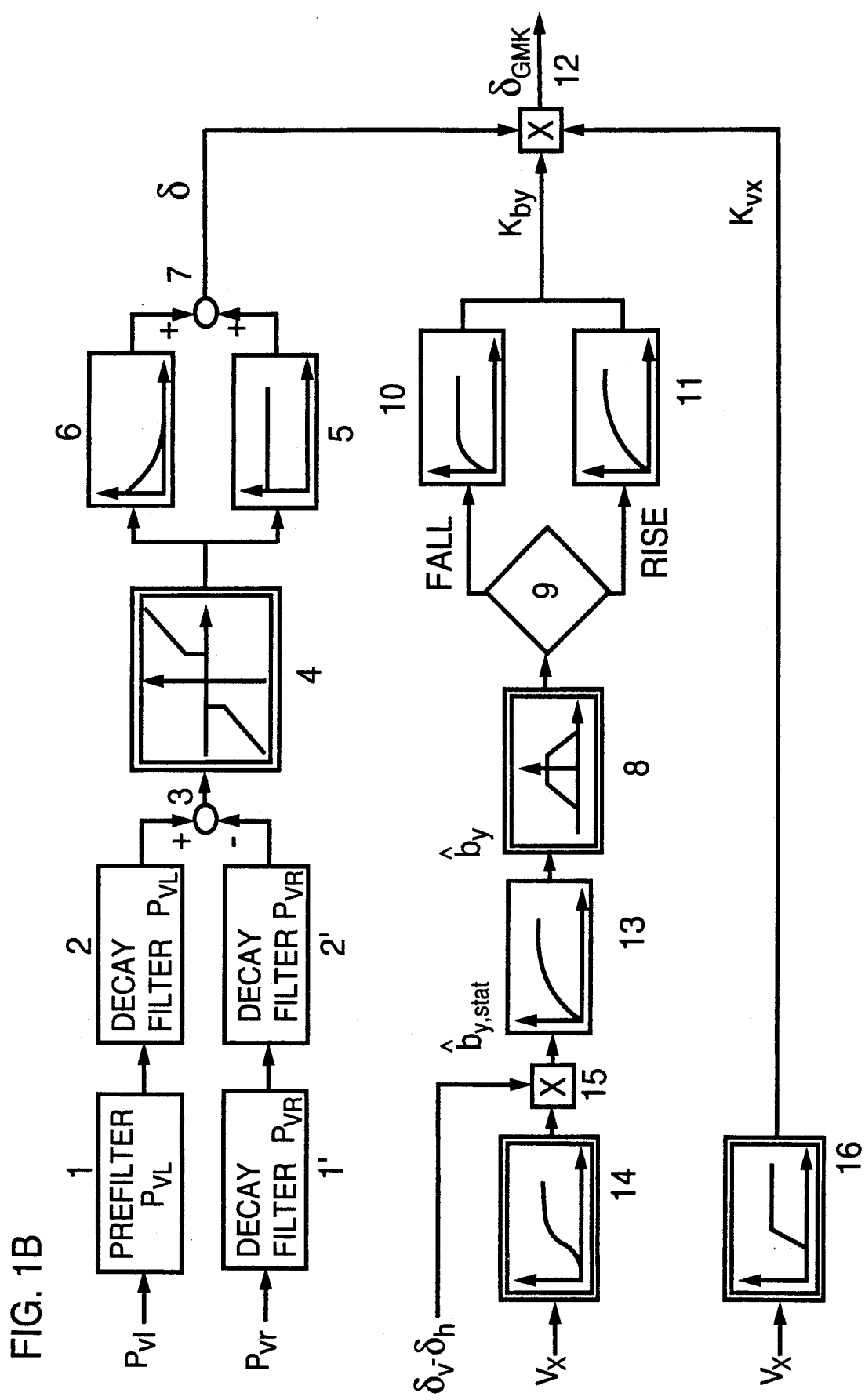
FIG. 1B is a block circuit diagram of an alternative compensation circuit wherein transverse acceleration $b_y$ is estimated.

The measured transverse acceleration $b_y$ can be replaced by and estimated static acceleration $b_y$ reproduced from the steering angles $\delta_v$ and $\delta_H$ and the vehicle speed $V_x$ (e.g., tachometer signal). This is shown in FIG. 1B. From the known linear one-lane model, in the static case the following equation can be derived for the transverse acceleration:

$$\hat{b}_{y,stat} = \frac{V_y^2 \cdot (\delta_v - \delta_h)}{l_o} \cdot \frac{1}{1 + (V_X/V_{ch})^2} \quad (1)$$

: wherein $V_x$ vehicle longitudinal speed

: $\delta_v$ front wheel steering angle

: $\delta_h$ rear wheel steering angle
$l_o$ wheel base
$V_{ch}$ characteristic speed
$b_{y,stst}$ estimated static acceleration
$V_{ch}$ is composed from the model parameters as follows:

$$V_{ch} = \sqrt{\frac{1}{\frac{m}{l_o^2} \cdot \left( \frac{l_h}{C_v} - \frac{l_v}{C_h} \right)}} \quad (2)$$

wherein: m: vehicle mass
$l_v$ : distance between center of gravity and front axle
$l_h$ : distance between center of gravity and rear axle
$C_v$: front axle resistance to change of course
$C_h$: rear axle resistance to change of course
With the parameters of a particular model, the result is a value of $V_{ch}$ of about 20 m/s.

In the case of a non-static driving maneuver (braked lane change) it appears that the static equation (1) attuned to cornering gives excessively high transverse accelerations. For this reason a dynamic circuit (low-pass filter with time constant $T_{bys}$) is added (block 13) which takes the vehicle dynamic into account.

When equation (1) is figured in the computer there is an opportunity to put down the part $$\frac{V_x^2}{l_o} \cdot \frac{1}{1 + (V_X/V_{ch})^2} \quad (3)$$

as a speed-related characteristic curve (block 14). Equation (1) is thus reduced to the interpolation of a characteristic curve (in block 14) as well as the multiplication of the result by the difference ($\delta_v-\delta_h$) (in block 15). The total transverse acceleration correction $K_{by}$ thus has the shape determined in the middle branch of FIG. 1.

In estimating the static transverse acceleration $b_{y,stat}$, the rear wheel steering angle $\delta_h$ is contained as an input factor. At the same time the estimate has an effect back on a portion of the rear wheel steering angle, namely the GMK portion. So that no feedback effects will occur in this case, only the portion of the rear wheel steering angle originating from other rear wheel steering control is considered as the input magnitude of the transverse acceleration estimate. For this purpose, left and right rear wheel steering angle sensors are provided, as shown in FIG. 1A.

For the suppression of the amplified turn-in by the yawing moment compensation at the end of braking in a curve, an amplification factor $K_{VX}$ dependent upon the vehicle speed is superimposed by multiplication.

Figure 4:
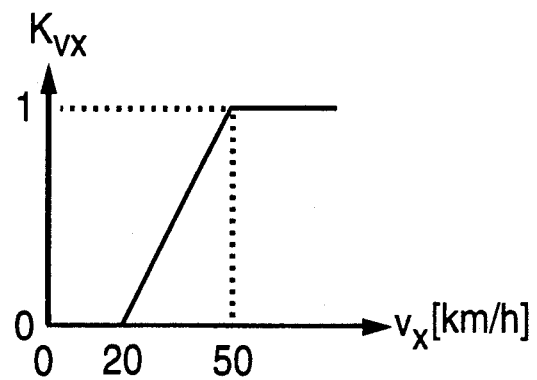
FIG. 4 is a curve of a speed dependent multiplying factor for the yawing moment compensation.

The curve representing an example of this amplification factor is stored in block 16 and represented in FIG. 4. Above 50 km/h, for example, the amplification factor remains unvaryingly at one, and in the range of, for example, 50 km/h to 20 km/h it continually diminishes toward zero. This measure is of secondary importance for μ-split braking, since vehicles with ABS show no manageability problems in the lower speed range.

This additional factor $K_{VX}$ is a multiplying factor in the multiplier 12. All-in-all the steering angle for the yawing moment compensation is thus:

$$\delta_{GMK} = K_{by} \cdot K_{VX} \cdot \delta$$

FIG. 1A depicts the overall system with the elements necessary to practice the invention. As is known from U.S. Pat. No. 5,089,067, a controller having inputs from wheel speed sensors and steering sensors generates outputs for ABS valves and rear steering valves. According to the present invention, front brake sensors provide the brake pressures $P_{VL}$ and $P_{VR}$ shown in FIG. 1, and a transverse acceleration sensor provides the measured acceleration $b_y$ in FIG. 1. If the vehicle speed is needed to estimate an acceleration factor $b_y$, a tachometer may be provided. While FIG. 1 shows front wheel pressures $P_{VL}$ and $P_{VR}$ used to calculate a compensation steering angle for the rear wheels, the front wheel steering may be influenced according to the same principle. In this case, rear wheel pressure sensors and front steering valves would be needed.

What is claimed is:

1. System for controlling yawing moment in a vehicle equipped with front wheel steering, rear wheel steering, and ABS control for individual wheels on at least one axle, said yawing moment being caused by different coefficients of friction on opposite sides of the vehicle during ABS control, said front and rear wheel steering being characterized by respective steering angles, said system comprising
    means for determining a brake pressure P at individually controlled wheels on one axle on opposite sides of the vehicle during ABS control,
    means for determining a difference ΔP between said pressures P on opposite sides of the vehicle,
    means for generating a compensation steering angle δ dependent upon said difference ΔP, said angle δ being zero for said difference ΔP up to threshold and thereafter consisting of a constant portion depending upon said difference ΔP added to a variable portion depending upon said difference ΔP, said variable portion decreasing to zero in a given time, and
    means for adjusting at least one of said front and rear wheel steering in dependence upon said compensation steering angle δ.

2. System according to claim 1, wherein said means for generating said compensation steering angle decreases said variable portion according to an exponential curve.

3. Vehicle according to claim 1 wherein said means for determining brake pressures measures said brake pressures.

4. System according to claim 1 further comprising a decay filter for filtering an input value based on the wheel brake pressures to produce an output value such that in the case of falling brake pressure the output value does not follow the input value fed to the decay filter in an initial phase, and that thereafter the output value follows the input value.

5. System according to claim 4 further comprising a prefilter having an input value based on the determined brake pressures and an output value which serves as said input value for the decay filter and containing a variable limitation on a rise of the output value of the prefilter, the variable limitation being raised from a given initial value to a maximum value whenever a change of the input value of the prefilter of the same sign persists over a period of time.

6. System according to claim 1 further comprising means for determining a vehicle speed and means for correcting the compensation steering angle δ by a correction factor $K_{VX}$ depending on the vehicle speed, said factor $K_{VX}$ being 0 below a lower speed limit and above said limit increasing to 1 at an upper speed limit and remaining at 1 with further increase in velocity.

7. System as in claim 1 further comprising
    means for determining the transverse acceleration $b_y$ of the Vehicle,
    a correcting apparatus for determining a correction factor which is 1 in the range of said transverse acceleration $b_y$ below a lower acceleration limit and diminishes from 1 to 0 between said lower acceleration limit and an upper acceleration limit, and
    means for modifying the compensation steering angle δ with the correction factor.

8. System as in claim 7 wherein said correcting apparatus is followed by a filtering apparatus whose output magnitude $K_{by}$ rapidly follows $b_y$ in the case of increasing $b_y$ magnitude, and in the case of decreasing $b_y$ magnitude follows $b_y$ Comparatively slowly, and that the output magnitude $K_{by}$ is multiplied with the steering angle δ.

9. System as in claim 8 further comprising means for determining said front and rear wheel steering angles and means for determining a vehicle speed, the transverse acceleration $b_y$ being estimated from the steering angles and the vehicle speed.

10. System as in claim 7 wherein said transverse acceleration $b_y$ is measured.

11. System as in claim 7 further comprising means for determining said front and rear wheel steering angles and means for determining vehicle speed, the transverse acceleration $b_y$ being estimated from the steering angles and the vehicle speed.

12. System for controlling yawing moment in a vehicle equipped with front wheel steering, rear wheel steering, and ABS control for individual wheels on at least one axle, said yawing moment being caused by different coefficients of friction on opposite sides of the vehicle during ABS control, said front and rear steering being characterized by respective steering angles $\delta_v$ and $\delta_H$, said system comprising means for determining a transverse acceleration $b_y$ of the vehicle, correcting means for determining a correcting factor which is 1 in the range of said transverse acceleration $b_y$ below a lower acceleration limit and diminishes from 1 to 0 between said lower acceleration limit and an upper acceleration limit, and means for modifying at least one of said steering angles $\delta_v$ and $\delta_H$ with said correction factor to generate a compensation steering angle $\delta_{GMK}$, and means for controlling the respective at least one of said front and rear wheel steering in dependence upon said compensation steering angle $\delta_{GMK}$.

* * * * *